Figure 1:
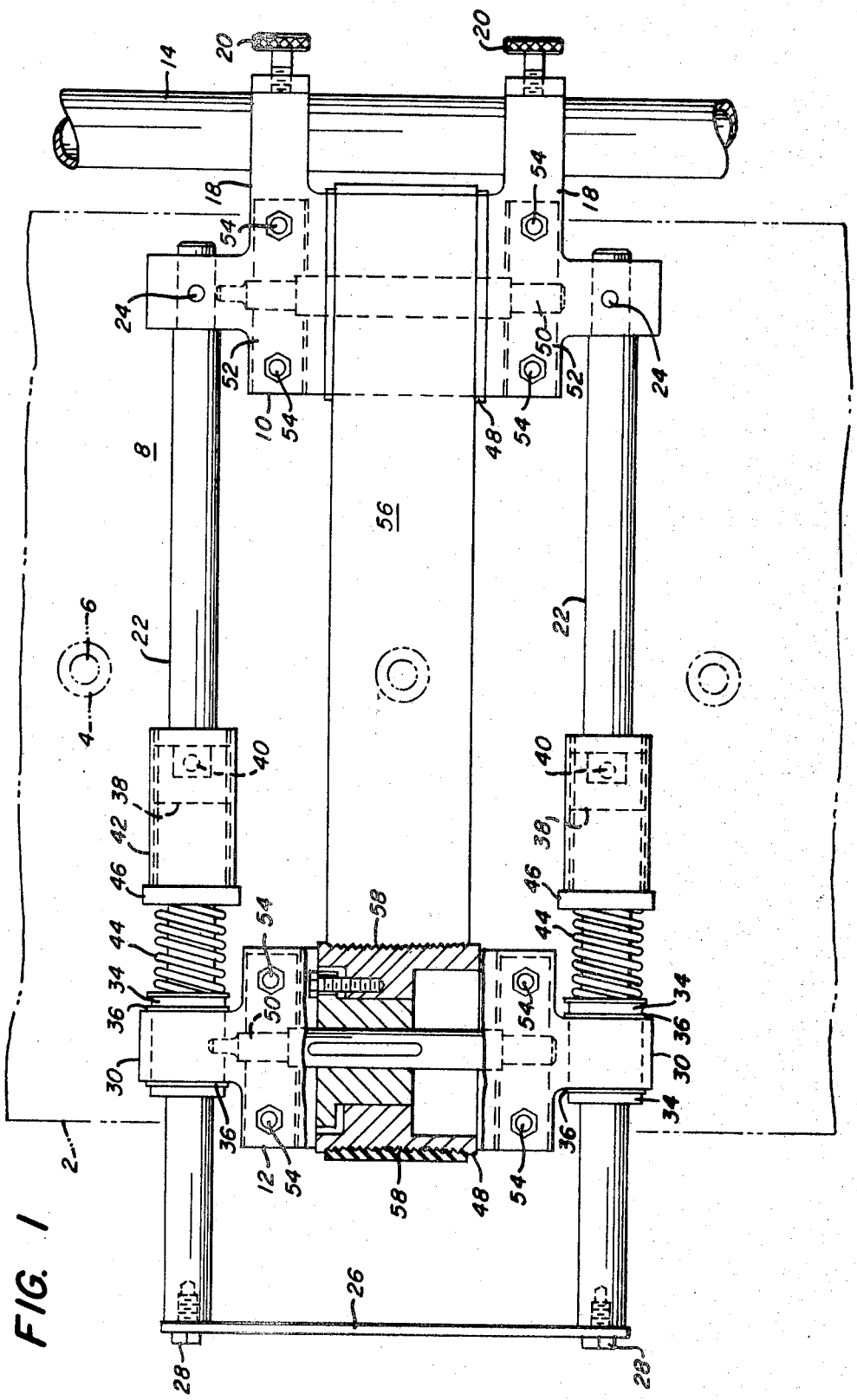

United States Patent [19]
Giunta et al.

[11] 3,738,151
[45] June 12, 1973

[54] STRIP LOAD SIMULATOR FOR SHAPE-MEASURING ROLL

[75] Inventors: Joseph S. Giunta, Monroeville Borough; Thomas E. Nicely, Delmont; Edward J. Patula, Monroeville Borough, all of Pa.

[73] Assignee: United States Steel Corporation, Pittsburgh, Pa.

[22] Filed: May 2, 1972

[21] Appl. No.: 249,639

[52] U.S. Cl. ................................................. 73/1 B
[51] Int. Cl. ........................................... G01l 25/00
[58] Field of Search ............................. 73/1 R, 1 B

[56] References Cited
UNITED STATES PATENTS
2,663,184  12/1953  Merrill et al. ......................... 73/1 B
3,656,337  4/1972  McDonald .............................. 73/1 B
3,688,571  9/1972  Atkins et al. ......................... 73/144

*Primary Examiner*—S. Clement Swisher
*Attorney*—Rea C. Helm

[57] ABSTRACT

A strip load simulator for calibration of a shape-measuring roll with load sensing devices has an endless belt tensioned between two pulleys and mounted in a frame pivoted so that the belt rests on the roll surface. When the roll is rotated, the weight of the frame, belt and pulleys moves the belt and provides a reproducible force to calibrate the load sensing devices.

5 Claims, 2 Drawing Figures

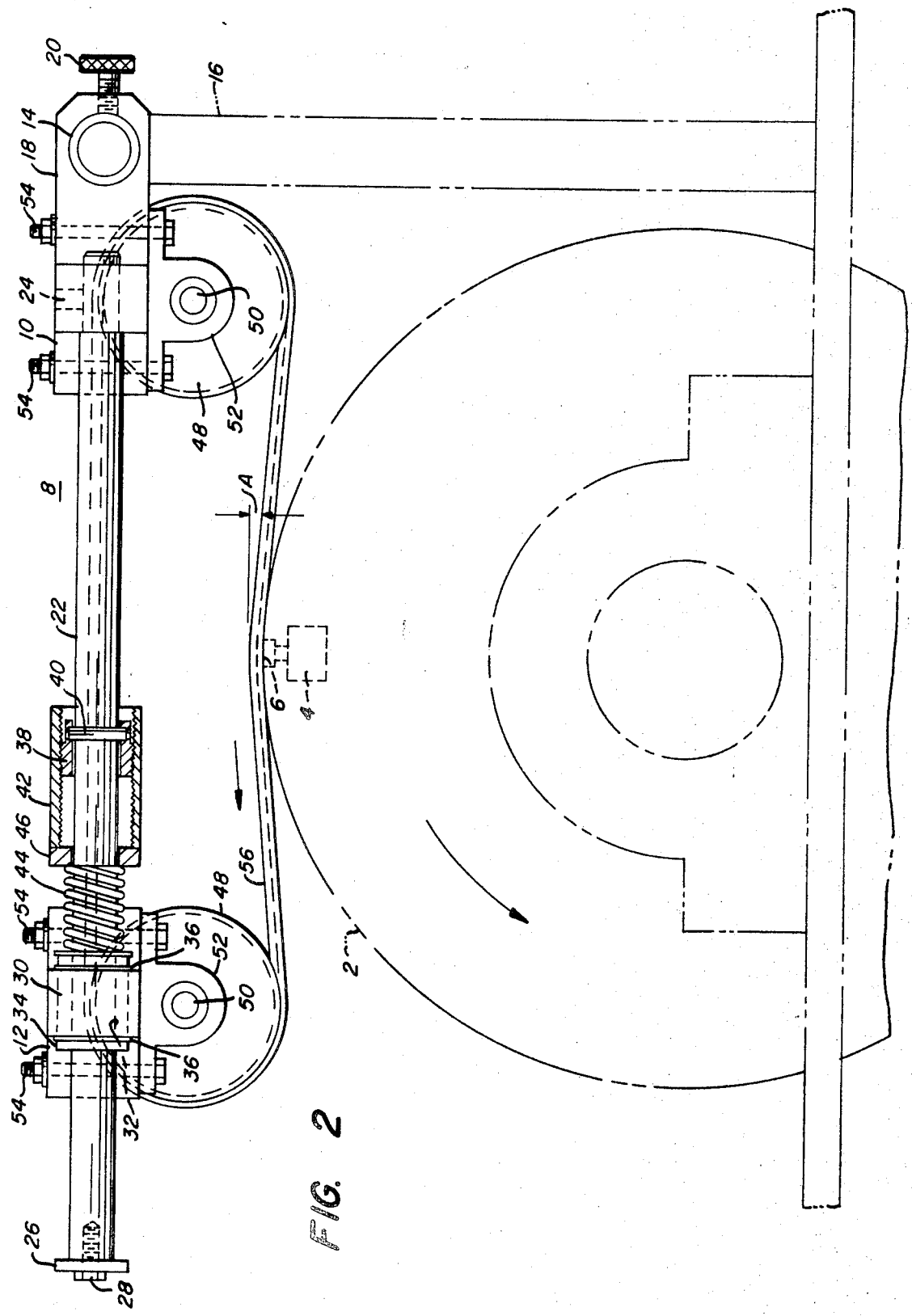

STRIP LOAD SIMULATOR FOR SHAPE-MEASURING ROLL

This invention relates to a load simulator for a shape-measuring roll and more particularly to apparatus which may be used in calibrating load sensing devices mounted in a roll for determining the shape of a flat product.

Variations in the flatness of a flat rolled product, such as steel strip, may be determined by passing the strip, usually under tension, partially around a roll with a row of pressure sensitive transducers mounted to measure pressure on the face of the roll. Differences in pressure on the transducers are a measure of roll flatness. However, apparatus to perform this function, such as Atkins et al., U.S. Pat. No. 3,688,571, dated Sept. 5, 1972 requires that the transducers be accurately calibrated so that the pressure differences may be properly determined. Calibration of such a roll has been accomplished by passing a long narrow strip over the pressure sensitive area or by hanging a weighted strip over the roll. Each of these methods had undesirable features. The former requires a special installation aside from the normal operating installation and requires accurate location of the strip over each roll sensor. The latter method requires the calibration to be made with the roll at rest which is unsatisfactory because it does not provide reproducible results.

In accordance with our invention, an endless belt, under a predetermined tension and mounted on a pivoted frame, is positioned on the shape-measuring roll. The roll is driven and the weight of the frame provides a reproducible calibrating load. The frame is permanently mounted and may be pivoted aside for a production run, and moved laterally for calibration of each sensor.

It is therefore an object of our invention to provide a strip load simulator for calibration of a rotating shape-measuring roll which produces reproducible results.

Another object is to provide a load simulator that may be mounted for operation with the measuring roll in the process line and yet may be readily installed or removed from the process line.

A further object is to provide a load simulator which may be easily moved from one calibration location to another calibration location, and in which the load and wrap may be readily adjusted.

These and other objects will become more apparent after referring to the following specification and drawings in which:

FIG. 1 is a plan view of our invention, partially in section, showing the location of the measuring roll; and FIG. 2 is an elevational view of our invention, partially in section, showing the location of the measuring roll and supporting arm.

Referring now to the drawings, reference numeral 2 refers to a shape-measuring roll, shown in phantom in FIG. 1, and only partly shown in FIG. 2. Roll 2 has a generally horizontal axis of rotation and a series of load sensing devices 4 terminating in sensing areas 6 on the surface of roll 2. In a typical installation, such as a cold rolled steel strip mill, roll 2 is power driven by any convenient means (not shown). As strip passes over the roll, outputs from the load sensing devices are compared to determine strip flatness. This is essentially the apparatus described in Atkins et al., U.S. Pat. No. 3,688,571.

The load simulator of our invention has a frame shown generally at 8. Frame 8 has a stationary mounting block 10 and a movable mounting block 12. A pivot 14 is mounted on support arms 16, one of which is shown partially in FIG. 2, so that the axis of pivot 14 is generally parallel and fixed with respect to the axis of roll 2. Block 10 has two pivot projections 18 with openings adapted to slide along pivot 14. A thumb screw 20 is located in the end of each pivot projection 18 to hold frame 8 in position with respect to pivot 14. A pair of guide rods 22 each have one end attached to block 10 by set screws 24 and the other end joined by a connector plate 26 held in place by screws 28. Movable block 12 has two side projections 30 with holes 32 for guide rods 22 arranged so that block 12 may move along guide rods 22 on linear ball bearings 34 held in place by retaining rings 36. An externally threaded member 38 is attached to each guide rod 22 by a pin 40. An adjustment nut 42 surrounds rod 22 and engages member 38. A compression spring 44 surrounds each rod 22 between a spacer 46 next to nut 42 and bearing 34. A pulley 48 is mounted in each of blocks 10 and 12 by a shaft 50 and pillow blocks 52 bolted to blocks 10 and 12 by bolts 54. A smooth continuous poly-V-belt 56 passes around pulley 48 in matching pulley grooves 58. Belt 56 is preferably a poly-V-belt, but other belts including timing and flat belts may also be used. The belt may be made of such materials as rubber, neoprene, steel strip or cord reinforced synthetics.

In operation, adjustment nuts 42 are rotated to place belt 56 under desired tension by the compression of springs 44. Frame 8 is then pivoted downward on pivot 14 until belt 56 rests on roll 2. Frame 8 is moved laterally along pivot 14 until the sensing area for calibration is located on the centerline of the belt as shown in FIG. 1. Thumb screws 20 are then tightened to maintain this alignment. The weight of frame 8 will provide a small angle of wrap around roll 2, as shown in FIG. 2, a typical angle A may be about 5°. The wrap needs only to be sufficient for the sensing device 4 to provide a signal for calibration. Shape-measuring roll 2 is then rotated moving belt 56 over pulleys 48 and the signal from the sensing device 4 is calibrated. The process is then repeated for each sensing device in roll 2.

When calibration is completed, frame 8 may be pivoted upward to a generally vertical storage position so that it will not interfere with the path of the moving strip. In this manner neither the load simulator nor the measuring roll need be removed when changing between calibration and actual shape measuring. Other means, such as vertical guide tracks, could also be used to move the load simulator towards and away from the measuring roll.

The load simulator provides excellent reproducible calibration forces and may be used on both smooth or rough measuring roll surfaces. So long as no slip occurs and the sensor signals are repeatable, the apparatus may also operate satisfactorily if roll 2 is not driven and one or both of pulleys 48 are driven instead. If the weight of frame 8 is insufficient for calibration, additional weights may be suspended from connector plate 26 or plate 26 may be spring loaded to provide the additional load.

We claim:

1. A strip load simulator for calibration of a shape-measuring roll having load sensing devices comprising a frame, a pair of spaced apart pulleys mounted on said frame and having axes generally parallel to the axis of the measuring roll, a flat endless belt passing over said pulleys and means for tensioning said belt whereby when the measuring roll is rotated and said tensioned belt is forced against said roll surface, the load sensing devices may be calibrated.

2. A strip load simulator according to claim 1 in which said frame is located above said measuring roll and is pivotable at one end on an axis generally parallel to the axis of the measuring roll whereby the weight of said frame, pulleys and belt provides said force against said measuring roll and which includes means for moving said frame laterally along said pivot axis and means for holding said frame in a desired position along said pivot axis.

3. A strip load simulator according to claim 1 in which the means for tensioning said belt includes a fixed mounting block in said frame for mounting one of said pulleys, a pair of spaced apart guide rods connected to said fixed mounting block, a movable mounting block for mounting the other pulley and adapted to move along said guide rods, a threaded member attached to each guide rod between said mounting blocks, an adjustment nut engaging each threaded member, and a compression spring between said adjustment nut and said movable block whereby said adjustment nuts may be rotated to compress said springs against the movable block thereby tensioning said belt.

4. A strip load simulator according to claim 3 in which said frame is located above said measuring roll and is pivotable at one end on an axis generally parallel to the axis of the measuring roll whereby the weight of said frame, pulleys and belt provides said force against said measuring roll and which includes means for moving said frame laterally along said pivot axis and means for holding said frame in a desired position along said pivot axis.

5. A strip load simulator according to claim 4 in which said belt is a poly-V-groove belt and said pulleys have matching grooves.

* * * * *